United States Patent [19]

Milner

[11] Patent Number: 5,265,545
[45] Date of Patent: Nov. 30, 1993

[54] METHOD AND APPARATUS FOR WASTE TREATMENT

[75] Inventor: William R. Milner, Redbank, Australia

[73] Assignee: Miltox Holdings Pte, Limited, Queensland, Australia

[21] Appl. No.: 768,955

[22] PCT Filed: Apr. 12, 1989

[86] PCT No.: PCT/AU90/00149
§ 371 Date: Dec. 5, 1991
§ 102(e) Date: Dec. 5, 1991

[87] PCT Pub. No.: WO90/12251
PCT Pub. Date: Oct. 18, 1990

[30] Foreign Application Priority Data

Apr. 12, 1989 [AU] Australia ................ PJ3667

[51] Int. Cl.$^5$ .................................... F23G 5/00
[52] U.S. Cl. .................................. 110/346; 110/219;
110/222; 110/223; 110/246

[58] Field of Search ............... 110/219, 222, 223, 346, 110/246

[56] References Cited

U.S. PATENT DOCUMENTS

| 4,133,273 | 1/1979 | Glennon | 110/222 X |
| 4,640,203 | 2/1987 | Wolter et al. | 110/346 |
| 4,870,912 | 10/1989 | Lee | 110/246 |
| 4,890,563 | 1/1990 | White et al. | 110/246 |

Primary Examiner—Edward G. Favors
Attorney, Agent, or Firm—Amster, Rothstein & Ebenstein

[57] ABSTRACT

A method of treatment of waste material includes the steps of mixing the waste material with binder and pelletizing the mixture. The pellets are then coated with a non-agglomerating material selected to permit firing of the mixture without pellet agglomeration at a temperature above 1300° C. The coated pellets are fed to a kiln and fired at a temperature above 1300° C. before being discharged from the kiln. At least some of the heat of firing the pellets is recovered and recycled to the kiln.

18 Claims, 8 Drawing Sheets

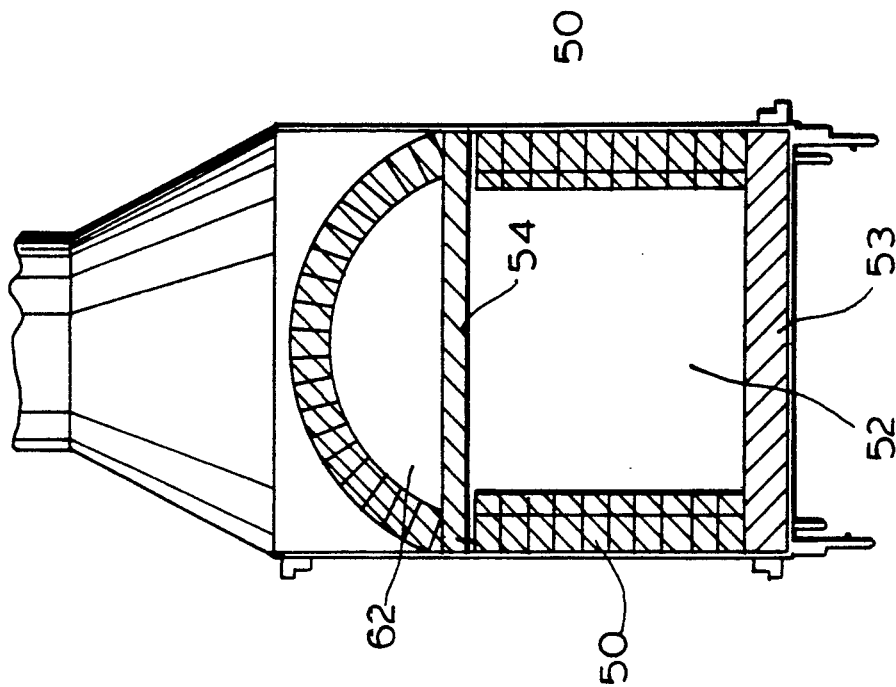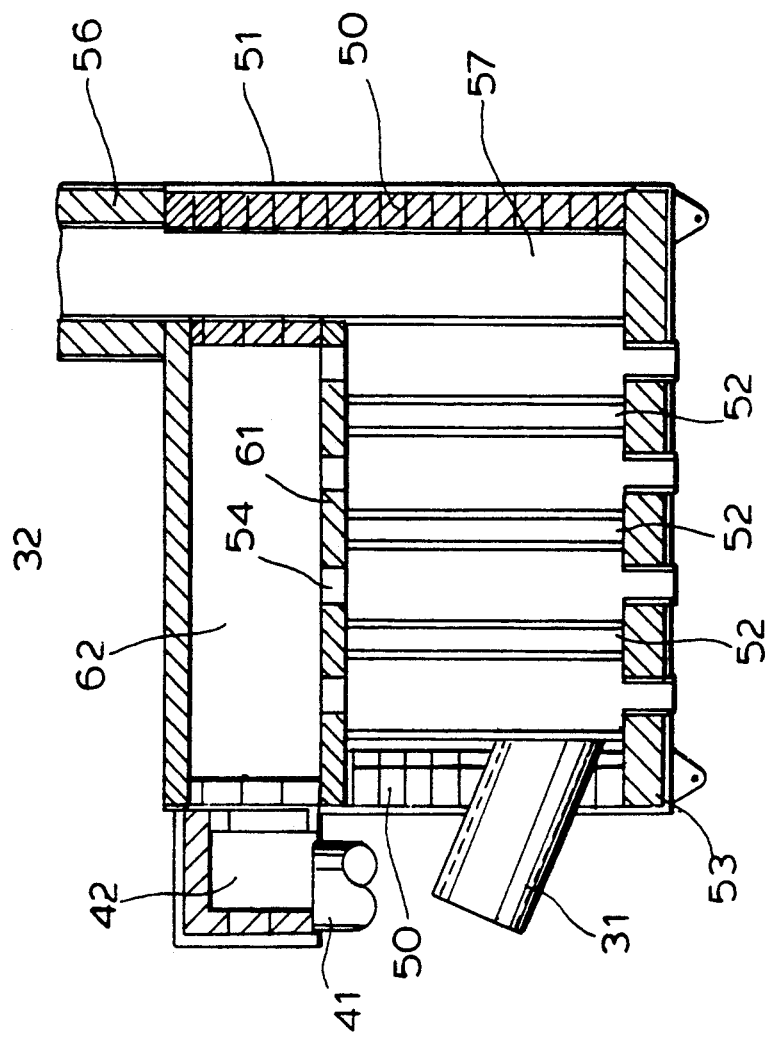

METHOD AND APPARATUS FOR WASTE TREATMENT

This invention relates to apparatus methods of waste treatment.

This invention has particular but not exclusive application to apparatus and methods for the incinerative processing of waste with organic content, and for illustrative purposes reference will be made to such application However, it is to be understood that this invention could be used in other applications, such as the incinerative processing of waste other than organic material containing waste.

The exercise of industry has, as its inevitable consequence, the ongoing problem of disposal of the often toxic wastes produced thereby. Such waste may take any form from sub-micron particulates to liquids and gases and may contain substances of extreme human or environmental toxicity such as toxic metals, synthetic organic compounds and unnatural concentrations of normally innocuous substances such as hydrocarbons, refuse and sewage. Where the actual toxicity of industrial waste is not a significant factor in its disposal, treatment methods used in the past have presented a treated product that is of itself difficult to dispose of, either from an aesthetic point of view or from the point of view of the mass of treated material to be disposed of.

Highly toxic wastes of the organic type such as poly chlorinated aromatic hydrocarbons such as PCB's are presently disposed of by high temperature incineration Often, the waste must be transported overseas to be destroyed either at foreign specialized facilities or at sea. Foreign treatment is extremely expensive, a cost which is added to the cost of manufactures at home The establishment of cost effective facilities is only economic where very large quantities are to be treated since economic operation of such a high energy consumption process are only obtainable with scale. Disposal at sea, unrestrained by but nominally subject to International Laws, has resulted in dumping when economically expedient. Where incineration actually takes place, it is at reduced standards of emission control in terms of both the flue gases generated and the residue dumped.

Other less toxic wastes are disposed of by less intensive and more cost effective treatments such as by cementation and burial or dumping of the solid waste product. This method of disposal presents the problem of the disposal of the liquid supernatant of the cementation process as well as the disposal of an increased volume of often leachable solid material. Sewage waste solids are generally even more simply disposed of by settling and evaporation of primary treatment slurries followed by open-site dumping of the partially dewatered sludge. Although the level of toxicity of the bulk waste is generally low, such treatment may concentrate toxic elements and substances in the solids dumped, resulting in the potential of leaching of toxic liquors into aquifers and watercourses.

Where hydrocarbon based waste such as condemned fuel and waste lubricants is to be destroyed, this has generally been by incineration. However, the energy values of such waste are generally wasted since water contamination of the waste prevents its use as incinerator fuel for treatment of other high-solids waste as the contaminating water normally causes blockage of standard burner jets Accordingly it is an object of the present invention to provide an apparatus and method for treating a broad variety of waste, which apparatus and which will alleviate the deficiencies of the prior art and are reliable, economical and efficient in use. Other objects and advantages of this invention will hereinafter become apparent With the foregoing and other objects in view, this invention in one aspect resides broadly in a method of waste treatment including mixing waste material with binder, pelletizing the mixture and firing the mixture in a furnace at a temperature above 1300 degrees celsius.

It has been found that heating the waste pellets to a temperature above 1300 degrees celsius, provides a product clinker having reduced leachability and increased chemical and physical stability. The flue gases are also less contaminated with unpyrolized contaminants compared with prior art processes.

The waste material may include any solid, liquid or mixed waste product including sewage sludges, oil sludges, common garbage or liquid toxic metal wastes, and including mixtures of waste materials. Preferably the waste material has a solid content and/or solids are added to the mixture before firing such that the mixture of the waste with the binder material is of a consistency suitable for pelletizing.

Preferably, the waste material has a combustible content and/or combustible materials are added to the mixture before firing such that the energy demand of the firing process is diminished. However, in the case of wastes having little or no inherent energy available from high temperature oxidation in air, it is envisaged that the entire energy requirement may be provided by an external source such as electricity, pulverized coal, gas or fuel oil.

Where the mixture is acidic, lime and lime containing materials or other basic materials may be added to at least partially neutralize the mixture during firing to control outgassing, resulting in the production of closed-surfaced fired pellets. Outgassing tends to form voids in the pellets which may reach the surface to form pores. This phenomenon may be desirable where the pellets are to be recycled to the process with, for example, a liquid waste adsorbed into the pellets.

Whilst many volatile materials may promote outgassing to achieve this effect, it is considered that the sulphur content of the pellet mixture is particularly relevant to the production of the desirable pore and void structure. Accordingly, the sulphur content of the pellet mixture may be varied by any means such as selection of wastes and addition of sulphur to promote sulphur out-gassing of the mixture during firing.

Where the nature of the material to be treated is such that it forms its own binder, then additional binder may not be required. Wastes such as primary sewage treatment sludge generally contains fats and greases which render the waste self-binding during the process of producing the unfired pellets. The furnace treatment of such waste results in an inert ceramic clinker.

The kiln may take any form consistent with the function of heating the pellets to a temperature in excess of 1300 Degrees Celsius Preferably, the kiln takes the form of a rotary downdraft kiln. The heating of the pellets in the rotary kiln may be controlled by varying the residence time of the pellets in the kiln. For example, residence time may be varied by varying one or more of the length of the kiln, the inclination of the kiln and its rate of rotation. Accordingly, it may be preferred to mount the kiln such that its axis of rotation may be varied. For very light material, the kiln may be almost vertical and the waste material can travel through the kiln in, for example, 40-120 seconds. The rotary kiln can be converted to an updraft furnace where the waste material is suspended by the expansion of the gases in the combustible waste materials. As the angle of the rotary kiln is increased, the speed of rotation is generally reduced and the movement of the material down the kiln is determined by the specific gravity of the material opposed to the expansion of the combustion gases.

The rotary kiln treatment as described above is of course an energy-intensive process requiring large amounts of combustible material to be either present in the waste itself or added in the form of furnace fuel oil or pulverized coal. Even where calorific yield of the waste itself is theoretically able to support a self sustaining continuous process in accordance with the present invention, the process is generally not so self sustaining due to the loss of available thermal energy via the hot flue gases and via incomplete combustion of the carbonaceous content of the waste.

Accordingly, in a further aspect, this invention relates to kiln apparatus of the type including a kiln body, feed means adapted to supply waste material to said kiln body, and discharge means for removing fired waste from said kiln body, wherein said kiln further includes heat recovery means whereby at least some of the heat of firing said kiln body may be recovered and recycled to said kiln body.

The kiln body may take any form consistent with the function of firing the preferably pelletized waste material. For example, the kiln body may comprise a rotary kiln of the updraft or downdraft (counter-current) type. Preferably, the kiln body member is an inclined downdraft rotary kiln having forced ventilation to assist in obtaining the high temperatures and gas mass transfers required for efficient operation. The inclination of the kiln assists in the maintenance of separation of the individual pellets during firing as well as assisting in the transportation of the firing pellets along the rotary kiln barrel. The rotary kiln body is preferably lined with a refractory brick material such that processing temperatures in excess of 1300 Degrees Celsius may be attained.

Preferably, the rotary kiln body comprises a substantially cylindrical upper portion tapering down to a substantially cylindrical lower portion of lesser diameter, for the purposes of optimizing flue gas dynamics whilst accommodating the relatively large volume of unfired material in its upper portion.

The feed means may take any form consistent with its function of supplying waste material to the kiln body. Means contemplated for use in conjunction with the present invention include simple gravity fed chutes and the like, with or without mechanical feed assistance from augers, rams and the like.

The discharge means may also take any form consistent with its function, including simply discharging from the kiln body under gravity. However, it is preferred that the discharge means include means for recovery of heat from the aggregate product of the kiln, as will be described hereinafter.

The heat recovery means is preferably in the form of a heat exchanger adapted to recover flue gas heat and other wasted heat and to retransmit this recovered heat to the input materials for the kiln. Preferably, the heat exchanger comprises a thermally absorptive mass having at least one surface in contact with a source of excess furnace heat and having at least one other surface in contact with a resource to be fed to the furnace. In one particularly preferred embodiment the heat recovery means comprises a conduit mounted within the kiln body and adapted to convey the flue gases generated by the kiln to a heat exchanger. The conduit preferably conveys the flue gas out through the bottom of the kiln, contrary to the normal expedient of venting the kiln through the top. The top of the kiln body in this preferred kiln is substantially sealed except for the provision of a closable port allowing the entry of waste material to be treated.

Preferably, the heat exchange means is a gas to air exchanger adapted to heat air destined for combustion oxidizer for the kiln. On account of the high initial temperature of the flue gas as it exits the kiln it is preferred to fabricate the heat exchanger from refractory material. It is particularly preferred to provide a heat exchanger which of itself has significant thermal capacity such that control of the product air temperature can be exercised simply by control of the rate of air flow through the heat exchanger.

The air for the heat exchanger (and ultimately combustion if the waste material contains combustible substances) is preferably drawn from the atmosphere under ambient conditions by a vacuum blower drawing the air through the exchanger. This permits the recovery of a secondary source of waste heat, namely, the heat contained in the granular fired product of the kiln. Preferably, the air is drawn through or over the granular mass to preheat the air prior to its entry to the heat exchanger. Where the air is to be drawn over the granules, the granules are preferably discharged onto a* hot conveyor to increase the surface to volume ratio and thereby improve the heat recovery from this source.

After heating in the heat exchanger, at least a portion of the air is preferably passed through the waste material stock to increase its temperature prior to charging to the top of the kiln. The air is then preferably conveyed to the inlet of the kiln. The preheating of the pellets prior to firing results in the stripping of some water and combustible volatile components from the pellets. The airflow charged with these combustible components is preferably fed directly to the kiln whereupon the heat of the combustibles are available for immediate application to maintaining the kiln temperature.

Preferably at least a proportion of the preheated air is blown through the air passage of a burner used for preheating the kiln and/or "topping up" the energy level of the kiln. In any case it is preferred that the heated air is recycled to the kiln in its entirety, although it is contemplated that the heat may be further recovered in the form of boiler water or the like.

The flue gas after heat exchange has deposited a proportion of its volatile components in the heat exchanger. The flue gas vented from the heat exchanger may then undergo further precipitation and/or scrubbing to remove particulates and/or selected gaseous components before eventual venting to the atmosphere. The pellets are fired at a temperature above 1300 degrees celsius, higher temperatures preferably being used for the larger and/or heavier pellets.

The final nature of the pellets is dependent on the wastes used. Where the wastes are acidic, the wastes tend to become volatile in the presence of heat and oxygen and the gases produced result in more porous granules. The presence of carbon in the pellets can also be used to produce porous granules by controlling the temperature and the rate at which the plastic coating is formed about the granules. For high fused aggregates, arsenic waste materials may be used as arsenic is a good flux. The flux or fusion agent may be selected from any mineral agent capable of binding the ash or residue of the waste material at a temperature above 1300 degrees celsius. Suitable materials include clays, silica and other minerals, with clays being preferred for the reasons of cost and availability. However, the process has also proved to function effectively using other earthen materials, provided such materials, in combination with the waste material, are capable of being pelletized for firing.

The use of an oxidizing flux may be beneficial where there does not seem to be enough oxygen in the system. Where oxidizing conditions are required, possible flux mixtures which could be incorporated into the mixture are:

a) Magnesium oxide 10 parts
   Sodium carbonate 15 parts
   Potassium chlorate 1 part
b) Magnesium oxide 2 parts
   Sodium carbonate 3 parts
   Potassium nitrate 1 part
c) Sodium carbonate 1 part
   Magnesium oxide 2 parts
d) Aluminium oxide 1 part The oxidizing effect of one or other of these mixtures at elevated temperatures is known It is believed that the oxidizing nature of the mixtures at such elevated temperatures as are found in the present processes will assist in the breakdown of PCB's in the source material. Only carbon dioxide is produced from all the hydrocarbons burnt in the kiln whether the organic matter was from PCB's or any other source.

Preferably, the mixture is extrudable such that it may be formed into pellets by extrusion and shearing of the extrusion. Alternatively, the extruded material may be formed into pellets by die punching.

The pellets may be tumbled or rolled to produce a smooth surface which, depending on the nature of the materials involved, may provide a smooth surfaced final fired pellet product or a non porous aggregate. Preferably, the pellets are coated with aluminium silicate or other suitable non agglomerating material (e.g. refractory clays) to enable the pellets or granules to remain separate after firing.

The firing period may be of any suitable time depending on the nature of the waste to be treated. Quite long residence time, for example in excess of ten minutes, may be required for some wastes to render the resultant aggregates suitably inert. Other materials such as those containing high levels of volatile substances may only require short residence time of a few minutes.

Where the waste material to be processed is not of a readily granulated form, it is preferred to process the waste to a pelletizable form prior to furnace treatment of the waste. Garbage such as household garbage is preferably comminuted to a particle size suitable for granulation. When required the water content of the waste may be adjusted to enhance the pelletability of the waste. Wet waste may be thickened by the addition of thickening agents such as clay or other earthen material to enhance pelletability. It may be desirable to add both water to domestic garbage and a processing agent such as clay to ensure the production of suitable pellets for firing.

Comminution of waste may present a significant problem to economic waste processing. Accordingly, in a further aspect, this invention resides broadly in a comminutor for processing waste material including a housing having a chamber defined therein, a rotor mounted within said housing, drive means for said rotor, and a cutter blade mounted at the radial extremity of said rotor, said housing being provided with a first aperture located substantially axial to said rotor and second aperture located about a line substantially tangential to said rotor.

Preferably, the housing defines a substantially cylindrical circular space within which the rotor is mounted eccentrically, with the greatest space between the curved interior wall of the housing and the rotor being substantially diametric to the outlet. The rotor preferably takes the form of a bar like member mounted on a drive shaft and adapted to run in close proximity to a flat end wall of the housing.

The cutter blade generally takes the form of a projection substantially perpendicular to the rotor and extending parallel to the axis of rotation of the rotor. In one preferred embodiment of the present invention, cutter blades are mounted on the ends of a rotor which is symmetrical about its axis of rotation. Preferably, the ends of the cutter blades distal to the rotor are adapted to run in running grooves provided in a second end wall of the housing. Alternatively, the ends of the blades may be interconnected by a ring or the like which may run in a running groove provided in the end of the housing, the ring serving to prevent the blades splaying. The cutter blades are preferably removable to provide for replacement, both for the purpose of maintaining the apparatus and for the purpose of allowing the specification of the installed blades to be tailored to the type of waste to be comminuted.

The end wall away from the drive shaft is preferably apertured about the line of the axis of rotation of the rotor to define the first opening into the housing. Depending on the direction of rotation of the rotor, this aperture may be a waste entry port or a waste exit port. Suitably, this port is the waste entry port for liquid and soft wastes and the waste exit port for dry, solid wastes. The waste port preferably further comprises a hopper or the like to guide waste material into or out of the housing, and may be provided with a screen or the like as appropriate.

The second aperture is preferably an aperture in the curved wall of the housing disposed about a tangent to the arc described by the rotating rotor. Preferably, the aperture leads into a tubular body, fabricated to or formed integrally with the housing. The first aperture may also be provided with a screen to prevent oversize particles being conveyed out of the housing, if appropriate. Preferably, the rotating rotor passes close to the edge of the aperture which it approaches most closely. Since waste materials often contain abrasive materials, it is preferred that the operating clearances of the comminuting apparatus be adjustable, both for accommodating such wear and for allowing certain clearances to be tailored to suit particular types of waste material to be comminuted. In particular, it is preferred that the aforementioned innermost edge of the aperture is formed from an adjustable wear block or the like to maintain the clearance between the rotor and the aperture edge within specified limits.

As described above, it is preferred to granulate or pelletize the source waste material to ensure the production of the desired granular fused product. Whether the source material lends itself to pelletization or whether the product is the comminuted product of the above described comminutor, it is preferred to extrusion pelletize the product to ensure consistent pellet size such that the individual pellets obtain the same level of treatment and produce a product of predictable characteristics.

Accordingly, in another aspect this invention resides in pelletizing apparatus including:

a guide plate having a plurality of apertures therethrough;

a die plate spaced from said guide plates and having a plurality of apertures corresponding in position to the apertures in the said guide plate; and a platen movable in relation to said guide plate and said die plate and bearing a plurality of die pins corresponding in position to the said apertures in the guide plate, wherein waste material introduced between said plates is die cut into pellets by the advancement of said pins through the apertures in said plates.

The pelletizing apparatus may be contained in a housing having apertures for the receipt of mixture from, for example, an extruder. Preferably, the guide plate is in spring loaded relationship with the platen to permit the compression of the material introduced between the plates.

This invention aims to beneficially utilize the energy values of the waste. However, certain wastes require additional energy input for treatment in accordance with the present invention. At the same time, there are a range of liquid wastes which are energy rich but are difficult to pelletize for the above process. In the case of reasonably clean fuel waste this can be used to fire conventional burners. However, in the past it has been impractical to fire burners with the majority of hydrocarbon wastes since contamination, including the common water contamination of such wastes, has caused blocking of the burner jets, with the attendant risk of an uncontained liquid fire.

Accordingly, in a further aspect, this invention resides a burner apparatus of the type including:

an air passage having a fuel jet disposed therein;

a fuel supply to said jet;

an air supply to said air passage, and means for applying a periodic physical shock to said jet.

The air passage may take any form consistent with the function of supplying combustion air from the air supply to the fuel issuing from the fuel jet. For example, all common venturi type air passages have been found suitable for use in accordance with the present invention, and this type of air passage is preferred. However, it has been found that simple cylindrical air passages may suffice in burners of the present invention and it is envisaged that any other type of burner air tube may be used. The air passage is preferably comprised of a sleeve about the jet supplying a concentric flow of air to the fuel sprayed therefrom. Preferably, the air to said sleeve is supplied via a side branch air inlet connected to a source of pressurized air to permit unencumbered access to the rear of the jet, for reasons which will become apparent hereinafter.

The jet may take may form consistent with the function of supplying fuel in suitable form for combustion in the air flow of the air passage. Preferably, the jet is a substantially tubular jet having a side branch fuel supply line supplying liquid fuel. In common with jets in general, it is preferred that the tip of the jet be configured to provide dispersion or atomization of the fuel stream in the combustion air to assist in efficient combustion of the fuel.

The means for providing a periodic physical shock to the jet may take any form consistent with the function of physically jarring the jet to displace temporary jet blockages caused by water or other material incompatible with the fuel. Preferably, the jet is provided with a bore of enlarged diameter relative to that of the jet and located at and behind the side branch entry point, which enlarged diameter bore preferably contains a movable element which blocks the rear end of the jet.

Preferably, the movable element takes the form of a piston-like needle mounted in the bore and adapted for a degree of movement coaxial with the jet to allow the transmission of shock to the jet tube. The needle preferably extends rearwardly of the jet tube and bore through a packing gland to prevent loss of fuel past the needle. Whilst other types of jarring elements are of course contemplated, the piston-like needle described above provides the added advantage of a piston action providing hydraulic clearance of the jet as well as the jarring clearance.

Preferably, the means to supply a periodic shock to the needle and therefore the jet is provided by a solenoid driving a core to strike the rear of the needle and thereby periodically clear any blockage of the jet. The solenoid may be manually and periodically tripped to clear the jet as desired. However it is preferred to automatically cycle the solenoid by means of a timing circuit supplying operating current to the solenoid or by simply combining the solenoid with a make-and-break circuit operated by the core. The solenoid core is preferably retracted from the rear of the needle after each impact by the action of a return spring acting between the needle and the jet.

In order that this invention may be more readily understood and put into practical effect, it will be described with reference to the accompanying drawings wherein:

FIG. 3 illustrates heat exchanger apparatus suitable for use in conjunction with the kiln of FIG. 1;

FIG. 4 is an end view of the heat exchanger of FIG. 3;

Figure 1:
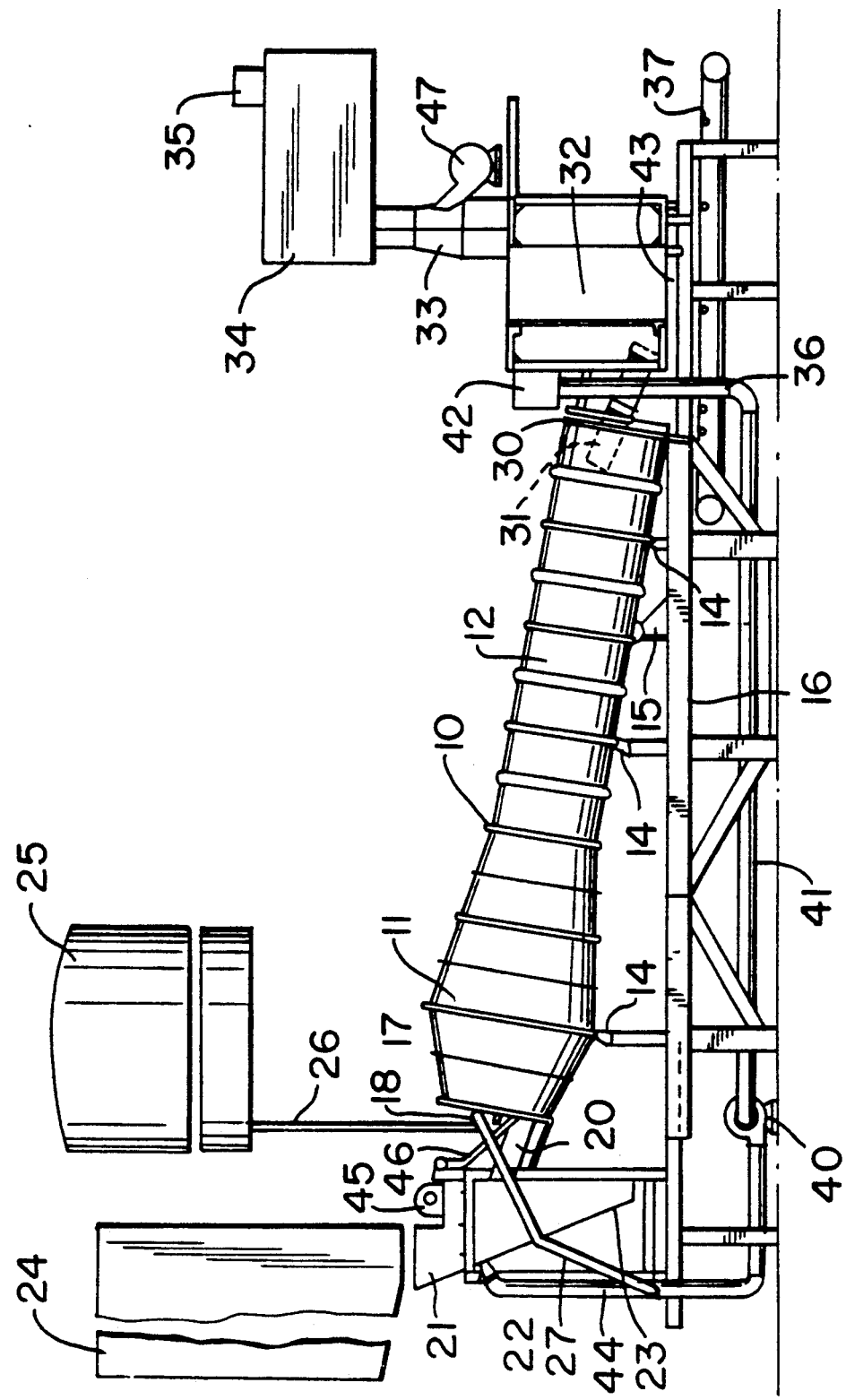
FIG. 1 depicts kiln apparatus in accordance with the present invention.
Figure 2:
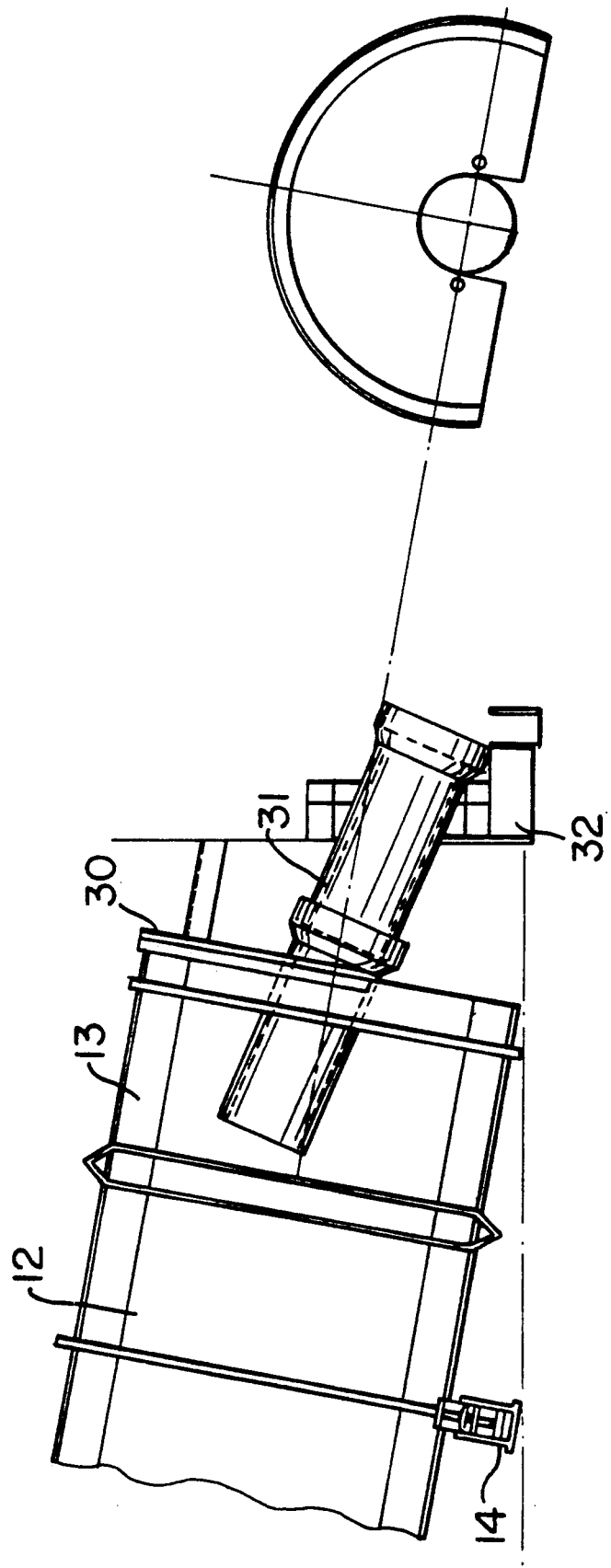
FIG. 2 depicts lower end detail of the kiln of FIG. 1.

As illustrated this invention includes a kiln 10, having an upper expanded portion 11, and lower a cylindrical portion 12. The kiln 10 is lined with a refractory lining 13 and is mounted for rotation at bearings 14, including end thrust bearing 15. The bearings transmit kiln loads to a supporting frame 16.

The upper end of the kiln 10 is provided with a closure plate 17, provided with a burner 18 and an inlet chute 20 for receiving pelletized waste material. The inlet chute 20 receives pellets from a pellet pre-heater 21, including a pre-heating screen 22 and a fines collection 23. The pre-heater 21 is fed from a pellet storage bin 24. The burner 18 received liquid fuel from tank 25 by a fuel line 26 and is supplied by air line 27 with preheated air.

At the lower end of the kiln 10 is blanking plate 30, perforated by flue gas conduit 31 which conveys hot flue gas to the heat exchanger 32. Flue gas exits the heat exchanger 32 via a stack 33, whereby the flue gas is conveyed to a scrubber/precipitator 34, to be vented to the atmosphere through vent 35. Hot incinerated waste materials are rejected at 36 to pass onto the perforated metal conveyor 37.

A blower 40 draws air through the heat exchanger 32 via hot air conduit 41 and air box 42. Air enters the heat exchanger 32 through the base thereof after having traversed the metal belt 37 and the hot waste material. To assist this the base of the heat exchanger 32 is open at 43. Pressurized hot air from the blower 40 is conveyed via conduit 44 to the pre-heater 21 with a portion of the hot air being supplied to the burner 18 via the hot air line 27.

Volatiles expressed from the pellets on the screen 22 are fed directly to the kiln by a blower 45 through a line 46. Additional impetus is given to the discharge of flue gasses by the provision of flue gas blower 47. The heat exchanger 32 includes a refractory lining 50 in a housing 51 enclosing a flue gas space 52, closed by a base member 53 and a top member 54. High surface area air passages 55 are utilized, providing a passage for air through the chamber 52 which is isolated from the flue gasses issuing from the conduit 31. The space 52 is vented to a flue 56 via an exhaust box 57.

Air is drawn from the atmosphere to the high surface air passages 55 through inlets 60, the air exiting the high surface air passages though air vents 61 which discharge to an air box 62 communicating with the air box 42. Air may then be drawn along hot air conduit 41 to the blower 40.

Figure 5:
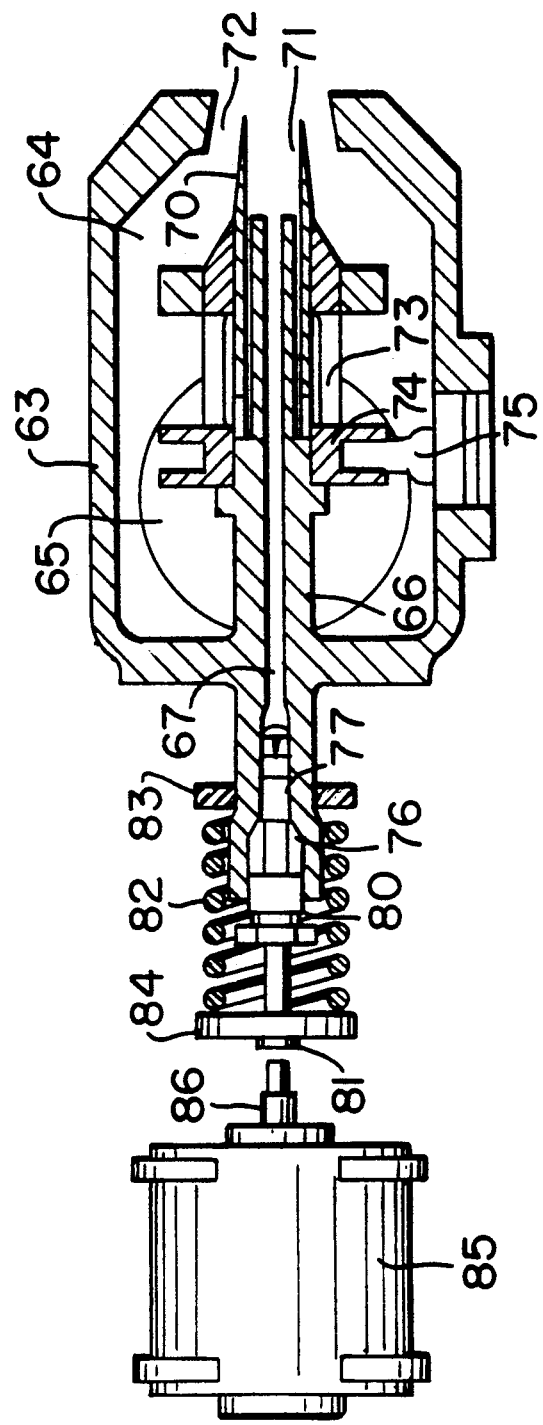
FIG. 5 is a burner apparatus in accordance with the present invention.

The burner 18 illustrated in FIG. 5 includes a body member 63 mounted to the blanking plate 17 and defining an air chamber 64 adapted to receive air via air inlet 65. Integral with the body member 63 and located within the air chamber 64 is a jet mounting portion 66 having a passage 67 defined therein. Concentrically mounted in the jet mounting portion and co-axial with the passage 67 is a jet 70 tapering to an atomising aperture 71 located in an atomising orifice 72 provided in the housing 63. Air and fuel are supplied to the passage 67, the air being supplied via ports 73 controlled by a slider valve 74 under control of an operating camp 75.

Mounted in an enlarged bore 76, coaxial with the passage 67 is a piston-like needle 77 which extends through a packing nut and gland 80 and is terminated by an anvil portion 81. The spring 82 operating between a stop 83 mounted to the body 63 and a stop 84 mounted to the piston-like needle 77 urges the needle 77 rearwardly. A solenoid 85 is periodically tripped such that the core 86 of the solenoid 85 impacts on the anvil portion 81 of the piston-like needle 77 thereby clearing the jet 70.

Figure 7:
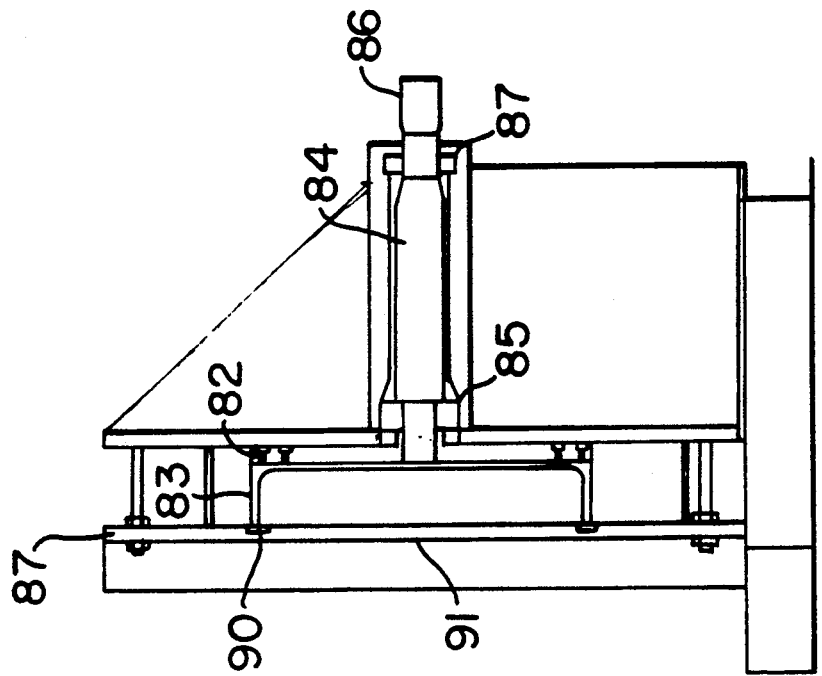
FIG. 7 is a side view of comminutor apparatus as illustrated in FIG. 6.
Figure 6:
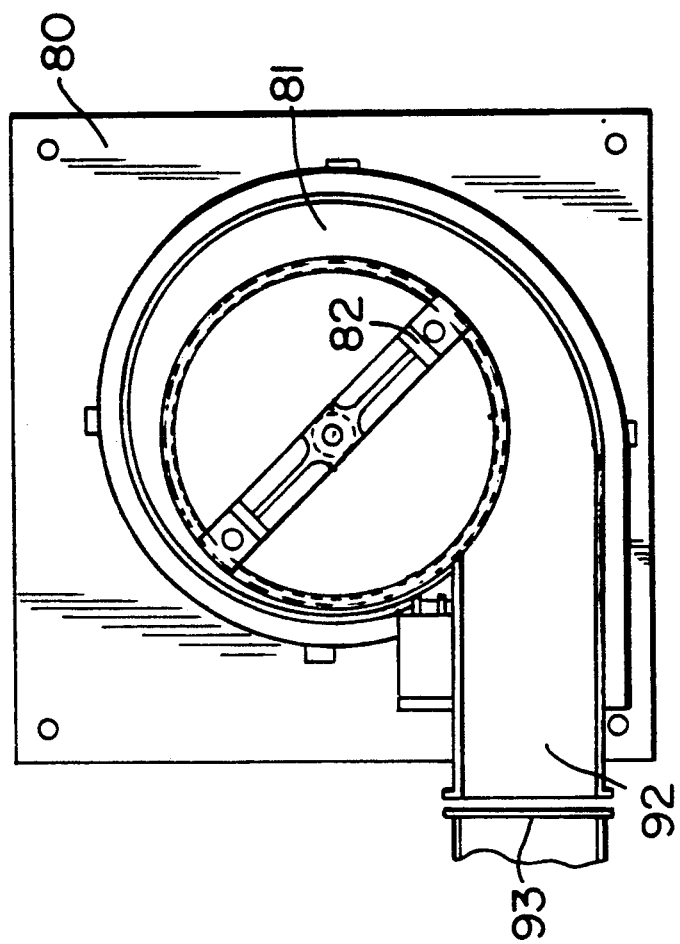
FIG. 6 is comminutor apparatus in accordance with the present invention.

FIGS. 6 and 7 illustrate a comminutor including a housing 80 defining a substantially cylindrical space 81 having a rotor bar 82 mounted for rotation therein. The rotor bar 82 is provided with blades 83 and is mounted to the housing 80 by means of shaft 84 supported by bearings 85. Power for rotating the rotor is transmitted through the splined drive end 86 of the drive shaft 84.

The front of the housing 80 is closed by closure plate 87 having grooves 90 in which the tips of the plates 83 run. An inlet 91 to the cylindrical space 81 is provided in the closure plate 87 and an outlet 92 is provided for discharging to the exterior of the apparatus.

Where dry waste such as household garbage is likely to the processed, the inlet 91 and the outlet 92 function as described, and the direction of rotation of the rotor is as indicated in FIG. 6. However, where wet waste is to be processed, the inlet and the outlet are interchanged. The outlet 92 may be provided with screen 93 to prevent oversize material from exiting the comminutor.

Figure 9:
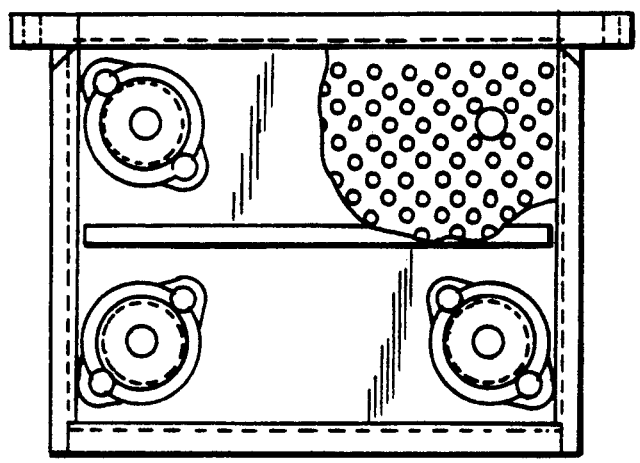
FIG. 9 is a partially cut away plan view of pelletizer apparatus of FIG. 8.
Figure 8:
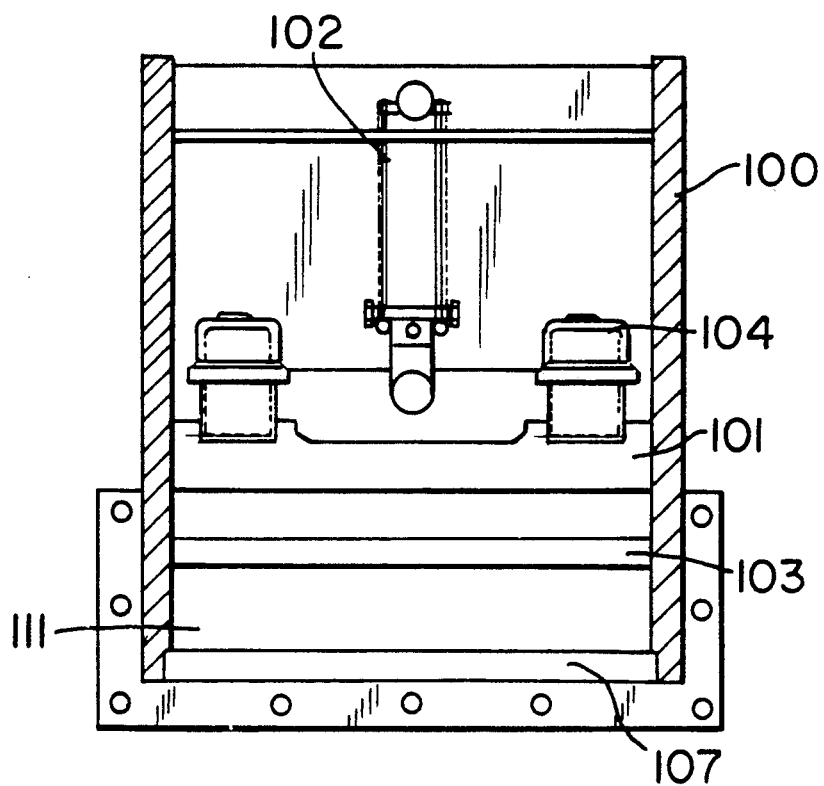
FIG. 8 is a cross-sectional end view of pelletizing apparatus in accordance with the present invention.
Figure 10:
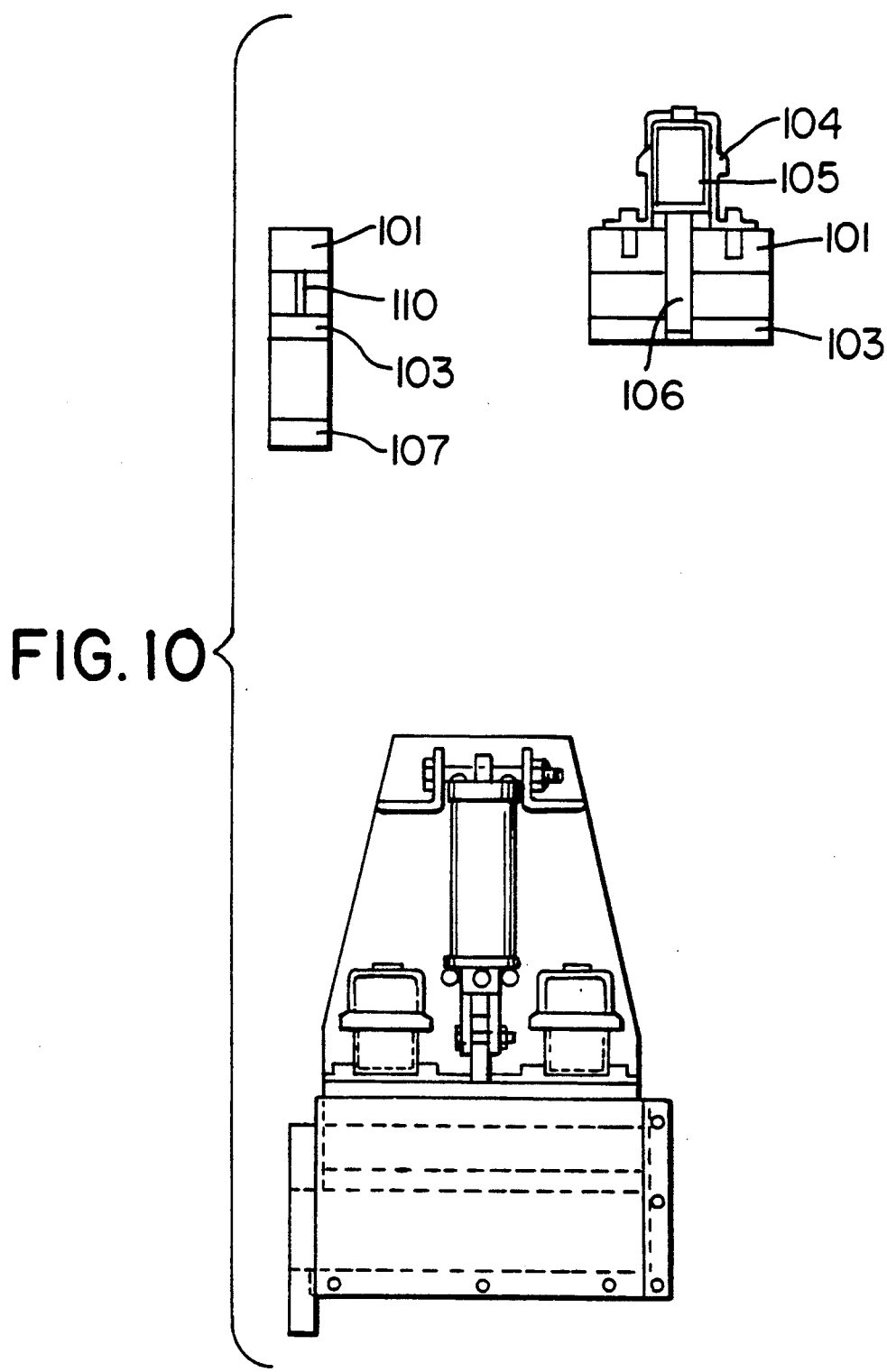
FIG. 10 is an end view of pelletizer apparatus in accordance with FIG. 8.

In the embodiment of a pelletizer illustrated in FIGS. 8, 9 and 10, there is provided a pelletizer including a housing 100, including a pin-bearing plate 101 movable within the housing and operable by double-acting hydraulic cylinder 102. Mounted within the housing beneath the bin plate is a perforated guide plate 103 which is connected to the pin plate 101 by means of spring towers 104, spring 105 and connecting rod 106. The base of the housing is closed by fixed perforated dye-plate 107. The pin plate 101 has pins 110 rigidly affixed thereto and corresponding in position to the apertures in the plate 103 and the dye-plate 107.

In use, pelletizable material is fed by, for example, a pugmill extruder to the space 111 defined between the guide plate 103 and the dye-plate 107. The spring loading provided for the guide plate 103 by the spring 105 ensures that the material is compressed before the pins 110 penetrate the mass to form the pellets through the dye plate 107.

Figure 11:
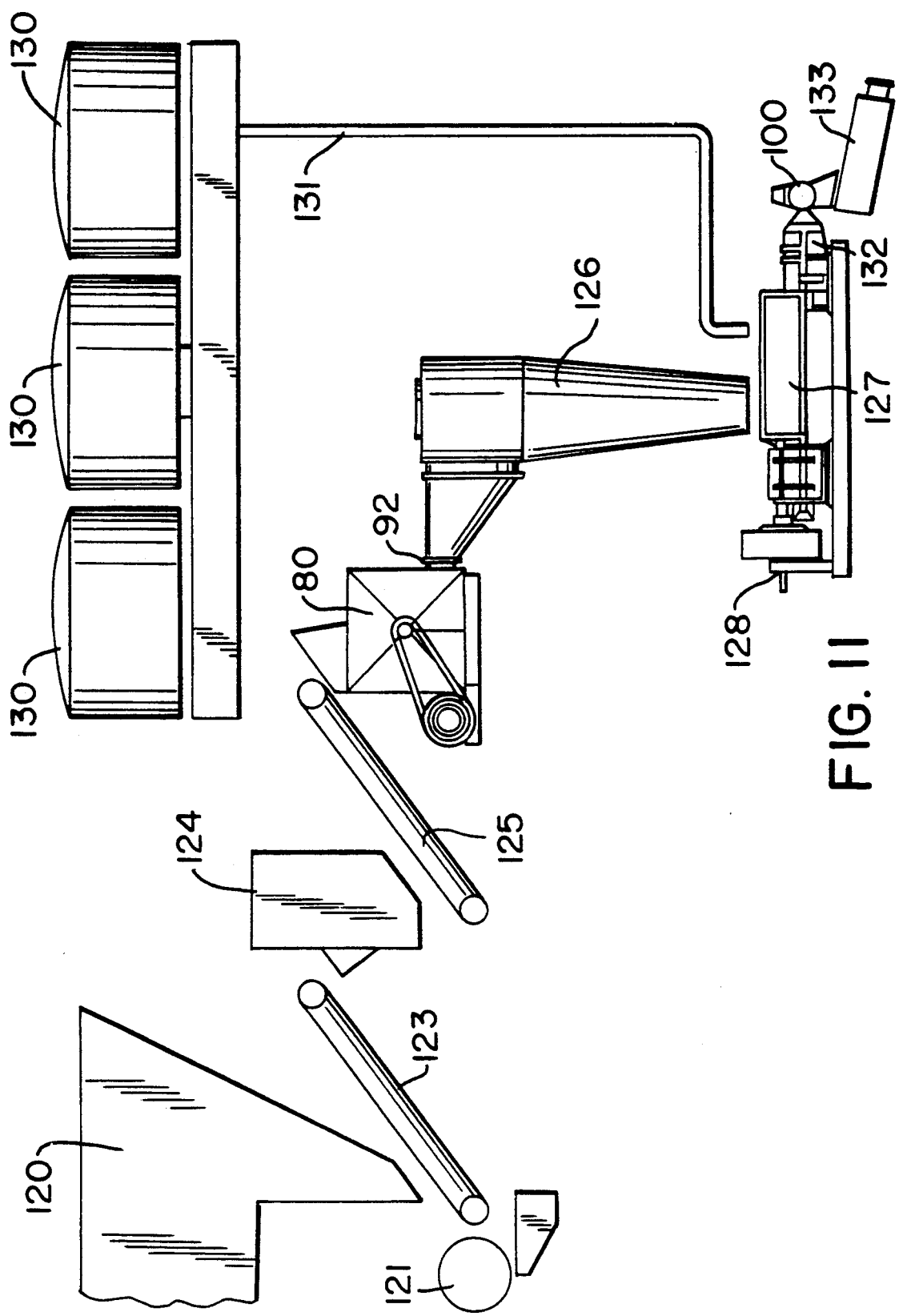
FIG. 11 is a schematic representation of Pellet production in accordance with the present invention.

FIG. 11 illustrates a schematic flow diagram of typical processing of material and pellets. Comminuted waste is conveyed to a sealed dump hopper 120 whereupon it is fed to a magnetic waste separator 121 which deposits magnetic recoverable waste into waste bin 122. The non-magnetic waste is conveyed by conveyor 123 to a pre-breaker 124 for initial comminution. A suitable pre-breaker 124 comprises a series of circular knives. From the pre-breaker 124, the waste is conveyed by conveyor 125 to the comminutor housing 80 where it is comminuted.

Comminuted waste is fed through the comminutor outlet 92 to a cyclone separator 126 where the waste is separated from its air stream. Precipitated waste is discharged from the cyclone 126 to a pugmill 127 driven by a motor 128 whereupon the waste is milled with an appropriate proportion of liquid waste transported from waste and sludge tanks 130 via delivery pipe 131. The proportions and type of waste and sludge and liquid are adjusted to provided a blended mixture which is extrudable from the pugmill by extruder 132 direct to the chamber 111, pelletizer 100.

From the pelletizer, the pelleted waste is dropped directly to a roller coating drum 133 where the pellets are rolled to improve their finish and/or coated with a fluxing agent as described. From the coating drum 133 the pellets may be conveyed to the pellet hopper 24. The pellets are then fired in the kiln for conversion to the desired form of waste product.

It will of course be realized that while the above has been given by way of illustrative example of this invention, all such and other modifications and variations thereto as would be apparent to persons skilled in the art are deemed to fall within the broad scope and ambit of this invention as defined in the claims appended hereto.

I claim:

1. A method of treatment of waste material including the steps of:
   mixing the waste material with binder;
   pelletizing the mixture;
   coating the pellets with a non-agglomerating material selected to permit firing of the mixture without pellet agglomeration at a temperature above 1300° C.;
   feeding said coated pellets to a kiln;
   firing the feed pellets at a temperature above 1300° C.;
   discharging said fired pellets from the kiln; and
   recovering and recycling to the kiln at least some of the heat of firing the pellets.

2. A method of treatment according to claim 1, wherein said waste material comprises its own binder.

3. A method of treatment according to claim 1, wherein said waste material has a combustible content and/or combustible materials are added to the mixture before firing.

4. A method of treatment according to claim 1, wherein the kiln is a rotary downdraft kiln.

5. A method of treatment according to claim 1, wherein the firing of said pelletized mixture is controlled by varying the residence time of the pellets in the kiln.

6. A method of treatment according to claim 5, wherein said residence time is varied by varying at least one of the length of the kiln, the inclination of the kiln and its rate of rotation.

7. A method of treatment according to claim 1, wherein flue gases emitted by said kiln are treated by precipitation and/or scrubbing to remove particulates and/or selected gaseous components before venting to atmosphere.

8. A method of treatment of waste material according to claim 1, wherein said non-agglomerating material is selected from aluminum silicate or refractory clays.

9. A method of treatment according to claim 1, wherein the heat recovery step includes heat exchange between kiln flue gases and kiln combustion air.

10. A method of treatment according to claim 9, wherein at least a portion of the heated kiln combustion air is passed through the waste pellets to increase their temperature prior to feeding to the kiln.

11. A method of treatment according to claim 9, wherein the heat exchange step is achieved by means of a heat exchanger comprising a thermally absorptive mass having at least one surface in contact with the kiln flue gases and having at least one other surface in contact with the kiln combustion air to be fed to the kiln.

12. A method of treatment according to claim 11, wherein the heat recovery step further comprises conveying the kiln flue gases to the heat exchanger through a conduit mounted within the kiln body.

13. A method of treatment according to claim 11, wherein the heat exchanger comprises a refractory material having a thermal capacity such that control of the air temperature may be effected by control of the rate of air flow through the heat exchanger.

14. A method of treatment according to claim 4, wherein the rotary kiln includes a kiln body comprising a substantially cylindrical upper portion and a substantially cylindrical lower portion of lesser diameter tan the upper portion, feed means for supplying pelletized waste material to the kiln body, and discharge means for removing fired waste from the kiln body.

15. A method of treatment according to claim 14, wherein the discharge means includes means for the recovery of heat from the discharged waste material.

16. A method of treatment according to claim 15, wherein the recovery of heat from the discharge waste material is effected by drawing at least a portion of the kiln combustion air through or over the discharged waste material to preheat the air.

17. A method of treatment according to claim 4, wherein the rotary kiln is lined with a refractory brick material such that processing temperatures in excess of 1300° C. may be attained.

18. A method of treatment according to claim 1 wherein the coated pellets are fired prior to any pyrolysis thereof.

* * * * *